(12) United States Patent
Lai

(10) Patent No.: US 8,278,771 B2
(45) Date of Patent: Oct. 2, 2012

(54) KINETIC ENERGY COLLECTION DEVICE

(75) Inventor: Jin-Shi Lai, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 607 days.

(21) Appl. No.: 12/577,718

(22) Filed: Oct. 12, 2009

(65) Prior Publication Data

US 2011/0031908 A1 Feb. 10, 2011

(30) Foreign Application Priority Data

Aug. 7, 2009 (CN) .......................... 2009 1 0305389

(51) Int. Cl.
*B60K 1/00* (2006.01)
(52) U.S. Cl. .......................... 290/1 R; 290/45; 180/65.2
(58) Field of Classification Search .................. 290/1 R, 290/3, 45; 180/65.2, 65.1
See application file for complete search history.

(56) References Cited

U.S. PATENT DOCUMENTS

| 3,499,163 | A  | * | 3/1970 | Verreault | 290/16 |
| 6,059,058 | A  | * | 5/2000 | Dower | 180/65.22 |
| 6,295,487 | B1 | * | 9/2001 | Ono et al. | 701/22 |
| 6,397,134 | B1 | * | 5/2002 | Shal et al. | 701/37 |
| 6,405,121 | B2 | * | 6/2002 | Tamura et al. | 701/96 |
| 6,502,652 | B2 | * | 1/2003 | Rogg | 180/65.21 |
| 6,923,281 | B2 | * | 8/2005 | Chernoff et al. | 180/65.245 |

* cited by examiner

*Primary Examiner* — Nicholas Ponomarenko
(74) *Attorney, Agent, or Firm* — Altis Law Group, Inc.

(57) ABSTRACT

A kinetic energy collection device is mounted on a vehicle body. The vehicle body includes drive disks rotated synchronously with wheels of the vehicle body. The kinetic energy collection device includes transmission units, a lift out unit, electrical generators, and an electrical storage. The transmission units are slidably mounted on the vehicle body and include friction disks. The lift out unit includes a braking controller, a pull rod connected with the braking controller, and connection rods rotatably connect the pull rod to the transmission units. The braking controller drives the pull rod to move in response to user's operations, so as to drive the connect rods to rotate, and thus to drive the friction disks of the transmission units to engage or disengage with the drive disks correspondingly. The transmission units drive the electrical generators to generate power. The electrical storage unit stores power generated by the electrical generators.

6 Claims, 5 Drawing Sheets

KINETIC ENERGY COLLECTION DEVICE

BACKGROUND

1. Technical Field

The present disclosure relates to a kinetic energy collection device for motor vehicle.

2. Description of Related Art

Motor vehicles need huge kinetic energy when moving. When the motor vehicles slow down, much of the kinetic energy will be wasted if it is not collected and converted.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
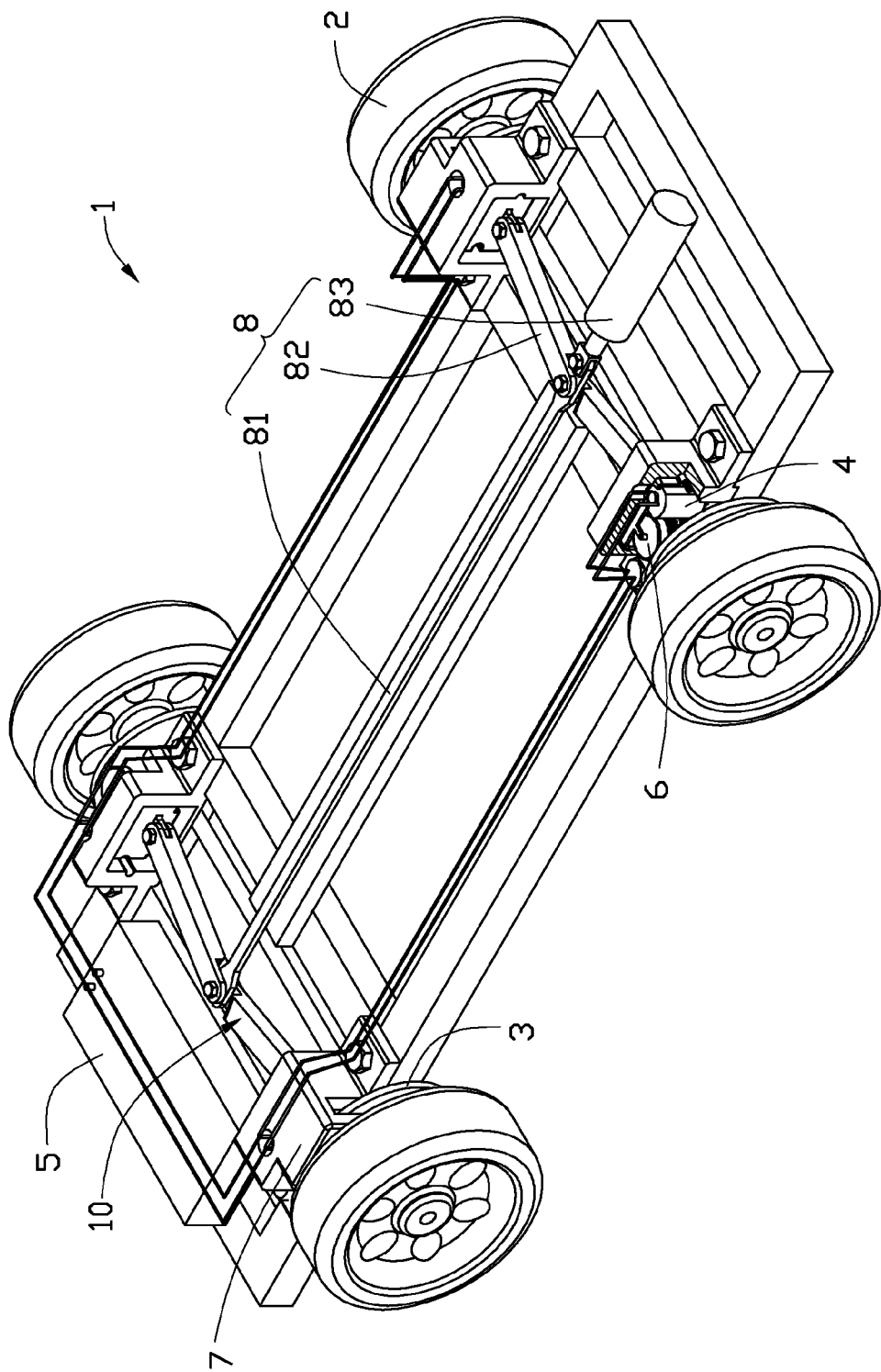
FIG. 1 is a schematic, cutaway, and isometric view of a vehicle body including a kinetic energy collection device in an unused state according to an exemplary embodiment.

Referring to FIG. 1, a vehicle body 1 of a motor vehicle and a kinetic energy collection device 10 mounted on the vehicle body 1 is disclosed. The vehicle body 1 includes four wheels 2, four drive disks 3 connected with the wheels 2, and four sleeves 7 mounted on the vehicle body 1 adjacent to the wheels 2. The drive disks 3 rotate synchronously with the wheels 2 when the motor vehicle moves.

The kinetic energy collection device 10 includes four drive transmission units 6, four electrical generators 4, an electrical storage unit 5, and a lift-out unit 8.

Figure 2:
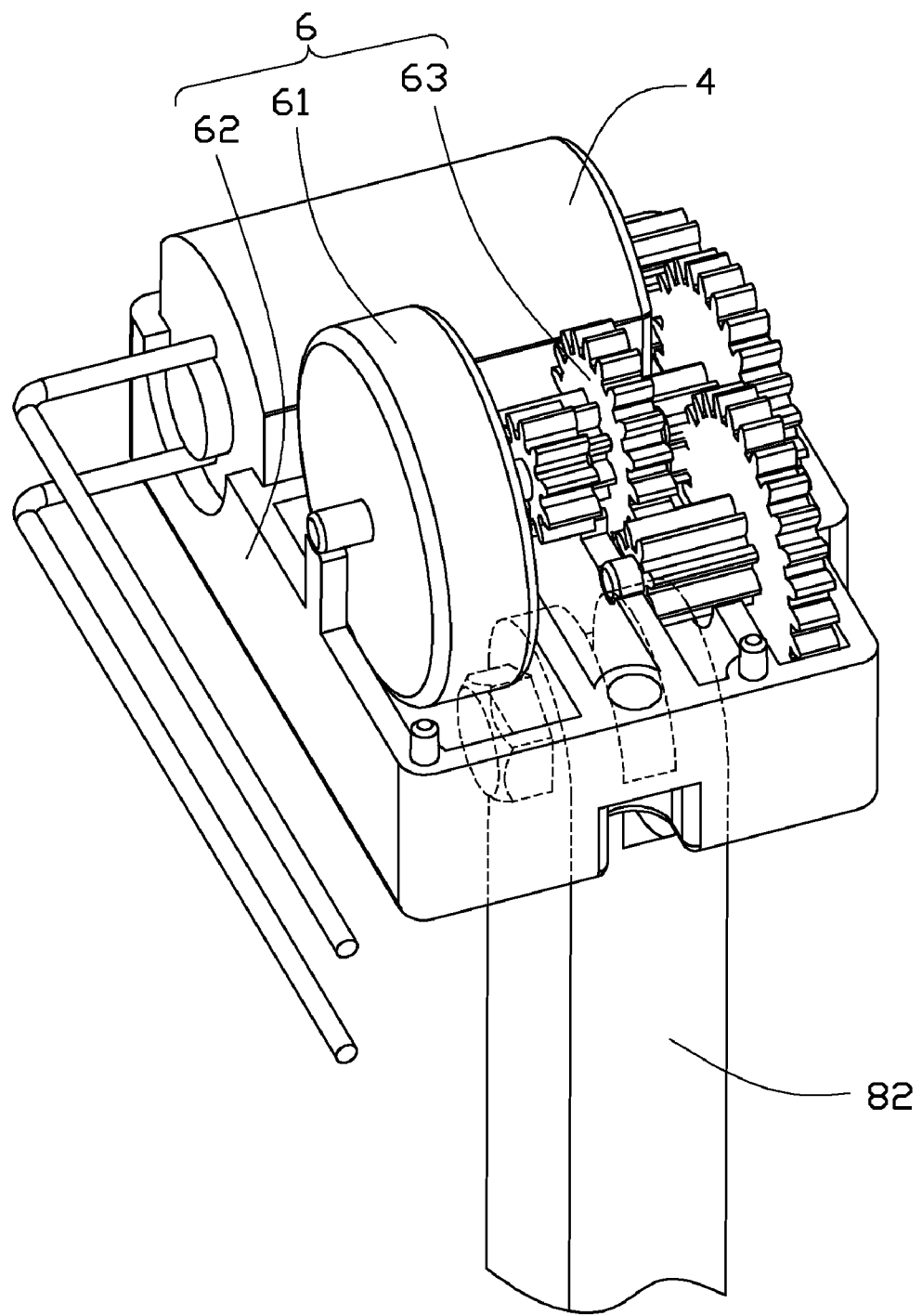
FIG. 2 is a schematic, enlarged view of a transmission unit of the kinetic energy collection device of FIG. 1.

The transmission units 6 are slidably mounted in the sleeves 7, respectively. Referring to FIG. 2, each transmission unit 6 includes a housing 62, a friction disk 61, and a gear train 63 rotatably mounted in the housing 62. Each transmission unit 6 can move toward the corresponding wheel to engage the friction disk 61 with the corresponding drive disk 3. The housing 62 further receives the electrical generator 4. An end of the gear train 63 is coaxially mounted with the friction disk 61, and the other end of the gear train 63 is coaxially mounted with the electrical generator 4. The gear train 63 is configured for promoting the rotation speed. A rotation of the friction disk 61 drives the gear train 63 and the electrical generator 4 in turn, and makes the electrical generator 4 to generate power.

The electrical storage unit 5 electrically connects with the electrical generators 4 and stores power generated by the electrical generators 4.

Figure 3:
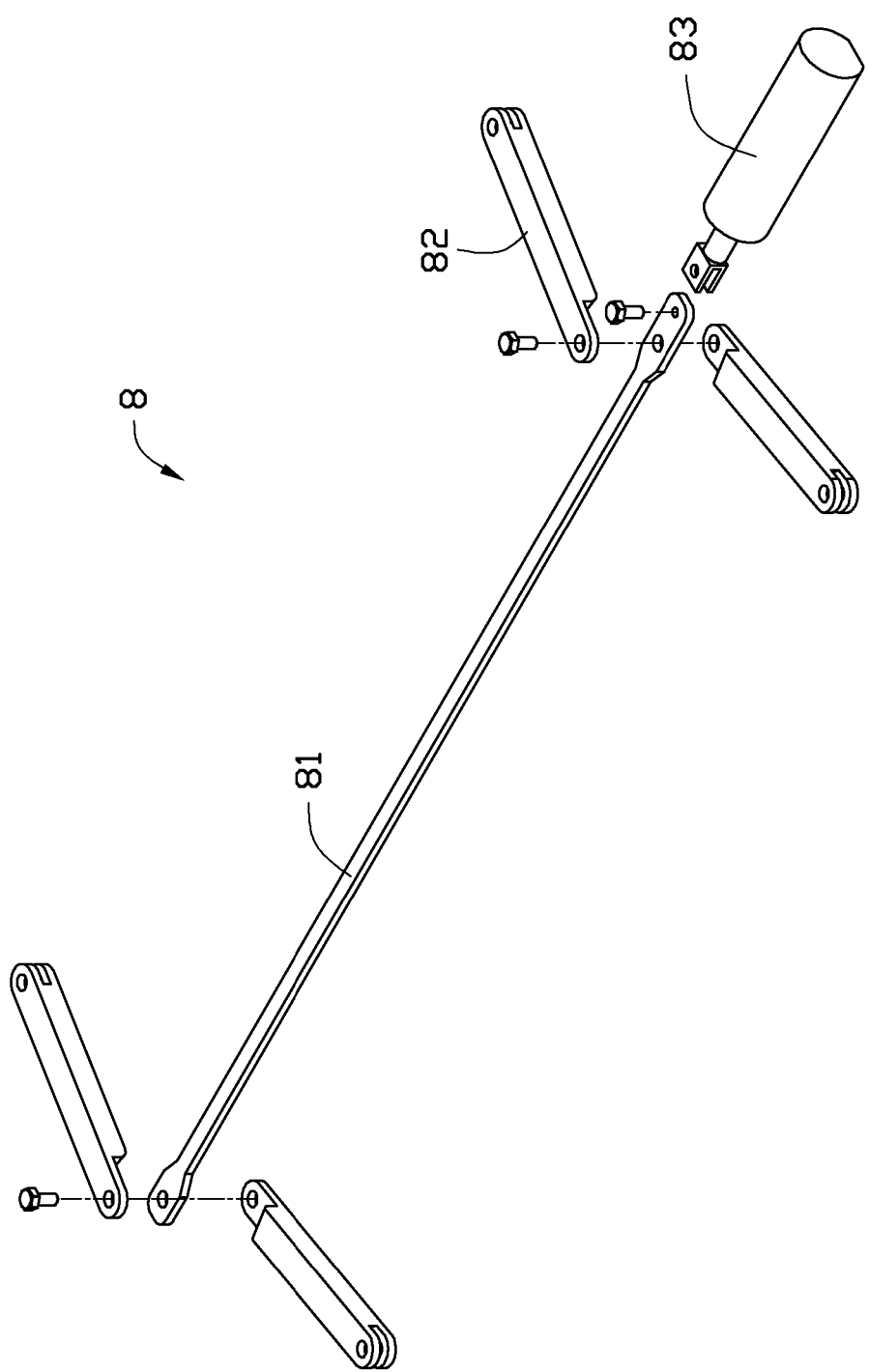
FIG. 3 is an exploded view of a lift-out unit of the kinetic energy collection device of FIG. 1.

Referring to FIG. 3, the lift-out unit 8 includes a braking controller 83, a pull rod 81, and connection rods 82.

The braking controller 83 is a part of a braking system of the motor vehicle, thus, a user can control the braking controller 83 by operating the braking system.

The pull rod 81 is mounted to the braking controller 83 by a screw and extends along the lengthwise direction of the vehicle body 1.

One end of each of the connection rods 82 rotatably connects to the pull rod 81 by a screw, two at each of the two opposite ends of the pull rod 81, and the other end of the connection rod 82 rotatably connects to the housing 62 of the transmission unit 6 by a screw. An angle greater than 0° is formed between the pull rod 81 and the connection rod 82. The connection rods 82 are disposed symmetrically about the pull rod 81.

Figure 4:
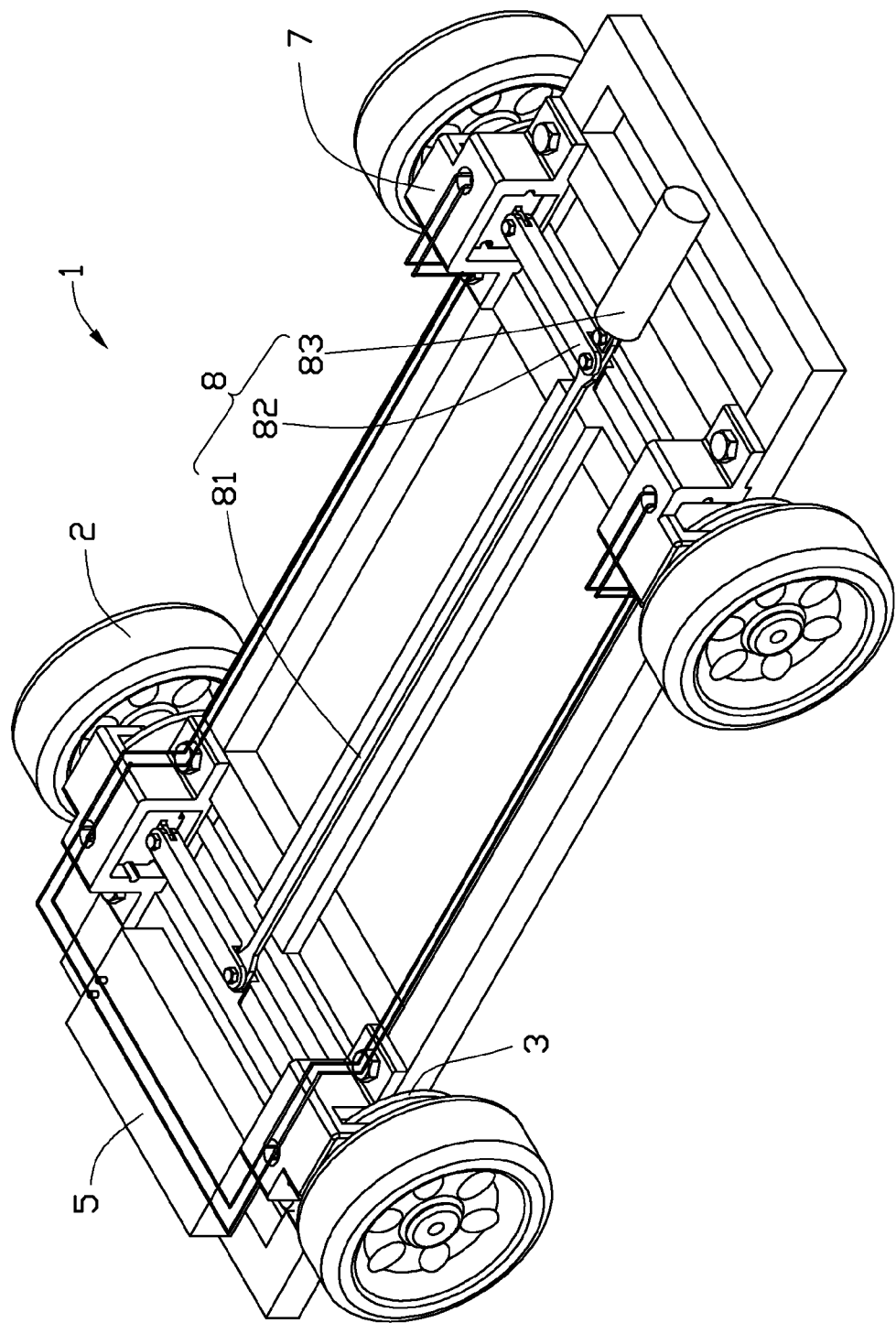
FIG. 4 is a schematic, isometric view of the vehicle body including the kinetic energy collection device in a used state.
Figure 5:
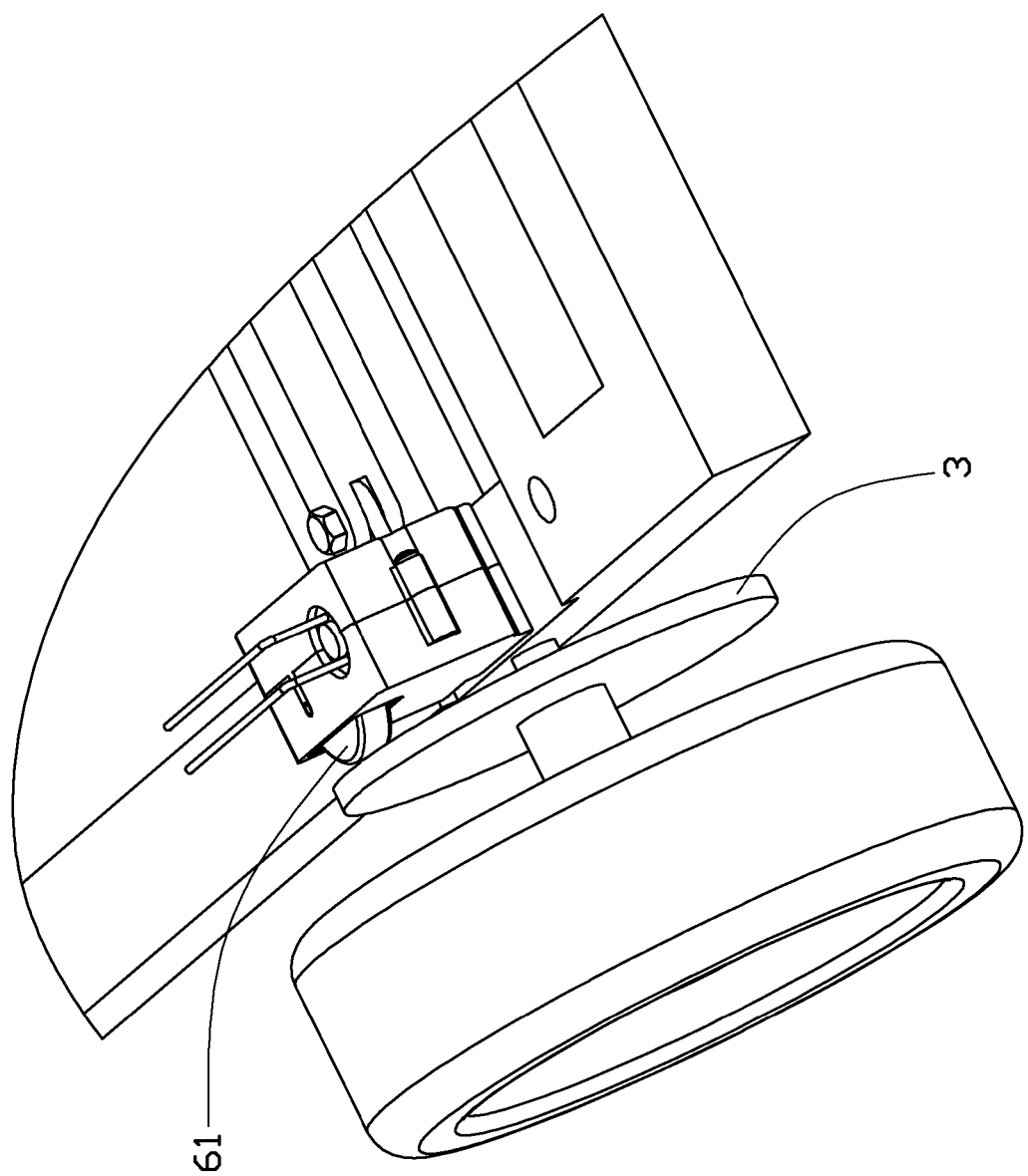
FIG. 5 is a partial, enlarged view showing the transmission unit of FIG. 4 in the used state.

Referring to FIGS. 4 and 5, when the user controls the braking controller 83 to push the pull rod 81 in, the connection rods 82 rotate correspondingly and push the transmission units 6 to close to the wheels 2, the friction disks 61 of the transmission units 6 contact the drive disks 3 firmly, thus to engage with the drive disks 3. The drive disks 3 drive the friction disks 61 to rotate, the friction disks 61 drive the electrical generators 4 through the gear train 63. The electrical generators 4 generate power. The electrical storage unit 5 stores the power generated.

When the user controls the braking controller 83 to pull the pull rod 81 out, the connect rods 82 rotate correspondingly and pull the transmission units 6 away from the wheels 2, the friction disks 61 disengage with the drive disks 3 anymore. Thus, the friction disks 61 stop to rotate, and the electrical generators 4 stop to generate power.

Moreover, it is to be understood that the disclosure may be embodied in other forms without departing from the spirit thereof. Thus, the present examples and embodiments are to be considered in all respects as illustrative and not restrictive, and the disclosure is not to be limited to the details given herein.

What is claimed is:

1. A kinetic energy collection device mounted on a vehicle body, wherein the vehicle body comprises drive disks rotated synchronously with wheels of the vehicle body, the kinetic energy collection device comprising:

at least one transmission unit slidably mounted on the vehicle body, each of the least one transmission unit being adjacent one of the drive disks and comprising a friction disk;

a lift-out unit comprising:
  a braking controller mounted on the vehicle body;
  a pull rod connected with the braking controller; and
  at least one connection rod for rotatably connecting the pull rod to the at the at least one transmission unit;

at least one electrical generator, corresponding to the at least one transmission unit and driven by the at least one transmission unit; and an electrical storage unit configured for storing power generated by the electrical generators;

wherein the braking controller is configured for driving the pull rod to move in response to user's operations, so as to drive the at least one connection rod to rotate, and thus to drive the friction disk of each of the at least one transmission unit to engage or disengage with the drive disk correspondingly.

2. The kinetic energy collection device of claim 1, wherein each of the at least one transmission unit further comprises gear train connecting between the friction disk and the electrical generator respectively.

3. The kinetic energy collection device of claim 2, wherein each of the at least one transmission unit further comprises a housing to house the friction disk, the gear train, and the electrical generator.

4. The kinetic energy collection device of claim 1, further comprising sleeves mounted on the vehicle body adjacent to the wheels, wherein each of the at least one transmission unit is slidably mounted in one of the sleeves.

5. The kinetic energy collection device of claim 4, wherein the at least one transmission unit comprises four transmission units; the at least one connection rod comprises four connection rods.

6. The kinetic energy collection device of claim 5, wherein the at least one connection rod are symmetrically about the pull rod.

* * * * *